UNITED STATES PATENT OFFICE.

JAMES LOWE, OF GUILFORD COUNTY, NORTH CAROLINA.

IMPROVEMENT IN DRYING AND PRESERVING FRUITS.

Specification forming part of Letters Patent No. 116,729, dated July 4, 1871.

*To all whom it may concern:*

Be it known that I, JAMES LOWE, in the county of Guilford and State of North Carolina, have invented and discovered a new and Improved Mode of Drying and Preserving Fruit.

The nature of my invention or discovery consists in peeling the fruit and cutting it up into thin slices and washing it in a solution of warm salt and water, at the rate of one pint of salt to four gallons of water, and drying in the sun, in the open air, or in a furnace.

Fruit prepared and dried in this manner cures up of a clear and bright color, pleasing to the eye and taste, and will be free from the attack of worms for any length of time on land, and, I believe, would undergo a long sea-voyage without injury from vermin.

What I claim as my invention, and desire to secure by Letters Patent, is—

The washing of the peeled and sliced fruit in a solution of salt and water before drying.

JAMES LOWE.

Witnesses:
RALPH GORRELL,
HENRY C. CLAPP.